United States Patent
Quinn

(10) Patent No.: US 12,112,030 B2
(45) Date of Patent: Oct. 8, 2024

(54) MAPPING USER INPUTS IN TWO DIRECTIONS TO A SINGLE DIRECTION FOR ONE-HANDED DEVICE INTERACTIONS WITH GRAPHICAL SLIDERS

(71) Applicant: Google LLC, Mountain View, CA (US)

(72) Inventor: Philip Quinn, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/753,197

(22) PCT Filed: Nov. 9, 2020

(86) PCT No.: PCT/US2020/059711
§ 371 (c)(1),
(2) Date: Feb. 23, 2022

(87) PCT Pub. No.: WO2021/126412
PCT Pub. Date: Jun. 24, 2021

(65) Prior Publication Data
US 2022/0276777 A1 Sep. 1, 2022

Related U.S. Application Data

(60) Provisional application No. 62/949,234, filed on Dec. 17, 2019.

(51) Int. Cl.
*G06F 3/04847* (2022.01)
*G06F 3/041* (2006.01)

(52) U.S. Cl.
CPC ...... *G06F 3/04847* (2013.01); *G06F 3/04186* (2019.05)

(58) Field of Classification Search
None
See application file for complete search history.

(56) References Cited

U.S. PATENT DOCUMENTS

2010/0231534 A1* 9/2010 Chaudhri ............ G06F 3/04883
345/173
2011/0191675 A1 8/2011 Kauranen
(Continued)

FOREIGN PATENT DOCUMENTS

DE 60209730 T2 7/2002

OTHER PUBLICATIONS

International Search Report and Written Opinion of International Application No. PCT/US2020/059711, mailed Feb. 22, 2021, 14 pp.
(Continued)

*Primary Examiner* — Amare Mengistu
*Assistant Examiner* — Sarvesh J Nadkarni
(74) *Attorney, Agent, or Firm* — Shumaker & Sieffert, P.A.

(57) ABSTRACT

A method includes outputting, for display, a graphical user interface that includes a graphical slider, the graphical slider including a trackbar that defines an axis in a first direction and a position indicator located at a first position along the trackbar. The method also includes receiving data indicative of a user input including a first displacement in the first direction and a second displacement in a second direction, the first direction perpendicular to the second direction. The method also includes mapping, based on both the first displacement in the first direction and the second displacement in the second direction, the user input to a second position along the trackbar. The method further includes outputting, for display, an updated graphical user interface that includes the position indicator at the second position along the trackbar.

20 Claims, 9 Drawing Sheets

(56) References Cited

U.S. PATENT DOCUMENTS

| | | | |
|---|---|---|---|
| 2012/0038681 A1* | 2/2012 | Summers | G06F 3/04855 345/173 |
| 2015/0074614 A1* | 3/2015 | Walker | G06F 3/04883 715/863 |
| 2015/0339044 A1 | 11/2015 | Matsuda | |
| 2016/0378237 A1* | 12/2016 | Zou | G06F 3/04883 345/173 |
| 2018/0074784 A1 | 3/2018 | Tsukada | |

OTHER PUBLICATIONS

International Preliminary Report on Patentability from International Application No. PCT/US2020/059711 dated Jun. 30, 2022, 9 pp.
Response to Communication Pursuant to Rules 161(1) and 162 EPC dated Jul. 26, 2022, from counterpart European Application No. 20819965.3, filed Jan. 25, 2023, 20 pp.

* cited by examiner

Slider Feedback
(Visible)

MAPPING USER INPUTS IN TWO DIRECTIONS TO A SINGLE DIRECTION FOR ONE-HANDED DEVICE INTERACTIONS WITH GRAPHICAL SLIDERS

This application is a national stage entry of WO International Patent Application No. PCT/US2020/059711, filed 9 Nov. 2020, which claims the benefit of U.S. Provisional Patent Application No. 62/949,234, filed 17 Dec. 2019, the entire content of each application is incorporated herein by reference.

BACKGROUND

Computing devices output, via display devices, graphical user interfaces that include graphical sliders. A user of the computing device may operate a graphical slider to change the volume, display brightness, etc. However, some users of the computing device may struggle to operate the graphical slider when holding the computing device in one hand and attempting to operate the graphical slider with the same hand. For example, a user's thumb may naturally move in an arc when the user uses a single hand to hold a computing device and interact with a straight line (e.g., horizontal or vertical) graphical slider displayed by a display device of the computing device.

SUMMARY

In general, the disclosed subject matter relates to techniques for mapping user inputs in two directions to a single direction for performing one-handed gestures. A computing device displays a graphical slider and receives a user input to manipulate the slider, for example, to change a volume level or a display brightness. The user input may include a horizontal and a vertical displacement (e.g., the user input may travel in two directions). For example, where a computing device displays a graphical slider controllable in a first direction (e.g., either horizontal or vertical), user input to operate the graphical slider may include a displacement in the first direction and a displacement in a second direction perpendicular to the first direction. The magnitude of the displacement in the second direction may be especially pronounced if the user holds the computing device in one hand and interacts with the graphical slider using the thumb on the same hand (e.g., as the user input may travel horizontally and vertically in an arcing motion).

In accordance with one or more techniques of this disclosure and in contrast to techniques that discard motion in one direction (e.g., by discarding vertical user inputs when the graphical slider is a horizontal slider or vice versa), the computing device may map the user input in both directions to user input in the same direction as the graphical slider. In this way, the displacement of the user input that is in the second direction (i.e., the direction perpendicular to the graphical slider) may still be used to alter the graphical slider (e.g., as if the graphical slider was bent in an arc). Mapping the user input in two directions to a single direction may cause the slider to move a distance that more accurately reflects the total distance traveled by the user input (e.g., the distance traversed by the user's thumb) rather than merely the movement of the user input in the single direction. In this way, the computing device may improve accuracy of the slider movement to enable the user to more effectively manipulate the graphical slider while holding and interacting with the computing device with a single hand, thereby potentially improving the user experience.

In one example, a method includes outputting, by a computing device and for display, a graphical user interface that includes a graphical slider, the graphical slider including a trackbar that defines an axis in a first direction and a position indicator located at a first position along the trackbar; receiving, by the computing device, data indicative of a user input including a first displacement in the first direction and a second displacement in a second direction, the first direction perpendicular to the second direction; mapping, by the computing device, based on both the first displacement in the first direction and the second displacement in the second direction, the user input to a second position along the trackbar; and outputting, by the computing device and for display, an updated graphical user interface that includes the position indicator at the second position along the trackbar.

In another example, a computer-readable storage medium is described including instructions that, when executed, cause at least one processor of a first computing device to perform operations including: outputting, by a computing device and for display, a graphical user interface that includes a graphical slider, the graphical slider including a trackbar that defines an axis in a first direction and a position indicator located at a first position along the trackbar; receiving, by the computing device, data indicative of a user input including a first displacement in the first direction and a second displacement in a second direction, the first direction perpendicular to the second direction; mapping, by the computing device, based on both the first displacement in the first direction and the second displacement in the second direction, the user input to a second position along the trackbar; and outputting, by the computing device and for display, an updated graphical user interface that includes the position indicator at the second position along the trackbar.

In another example, a computing system is described that includes at least one processor configured to perform operations including: outputting, by a computing device and for display, a graphical user interface that includes a graphical slider, the graphical slider including a trackbar that defines an axis in a first direction and a position indicator located at a first position along the trackbar; receiving, by the computing device, data indicative of a user input including a first displacement in the first direction and a second displacement in a second direction, the first direction perpendicular to the second direction; mapping, by the computing device, based on both the first displacement in the first direction and the second displacement in the second direction, the user input to a second position along the trackbar; and outputting, by the computing device and for display, an updated graphical user interface that includes the position indicator at the second position along the trackbar.

In another example, a system is described including means for outputting, by a computing device and for display, a graphical user interface that includes a graphical slider, the graphical slider including a trackbar that defines an axis in a first direction and a position indicator located at a first position along the trackbar; receiving, by the computing device, data indicative of a user input including a first displacement in the first direction and a second displacement in a second direction, the first direction perpendicular to the second direction; mapping, by the computing device, based on both the first displacement in the first direction and the second displacement in the second direction, the user input to a second position along the trackbar; and outputting, by the computing device and for display, an updated graphical user interface that includes the position indicator at the second position along the trackbar.

The details of one or more examples are set forth in the accompanying drawings and the description below. Other features, objects, and advantages of the disclosure will be apparent from the description and drawings, and from the claims.

DETAILED DESCRIPTION

Figure 1:
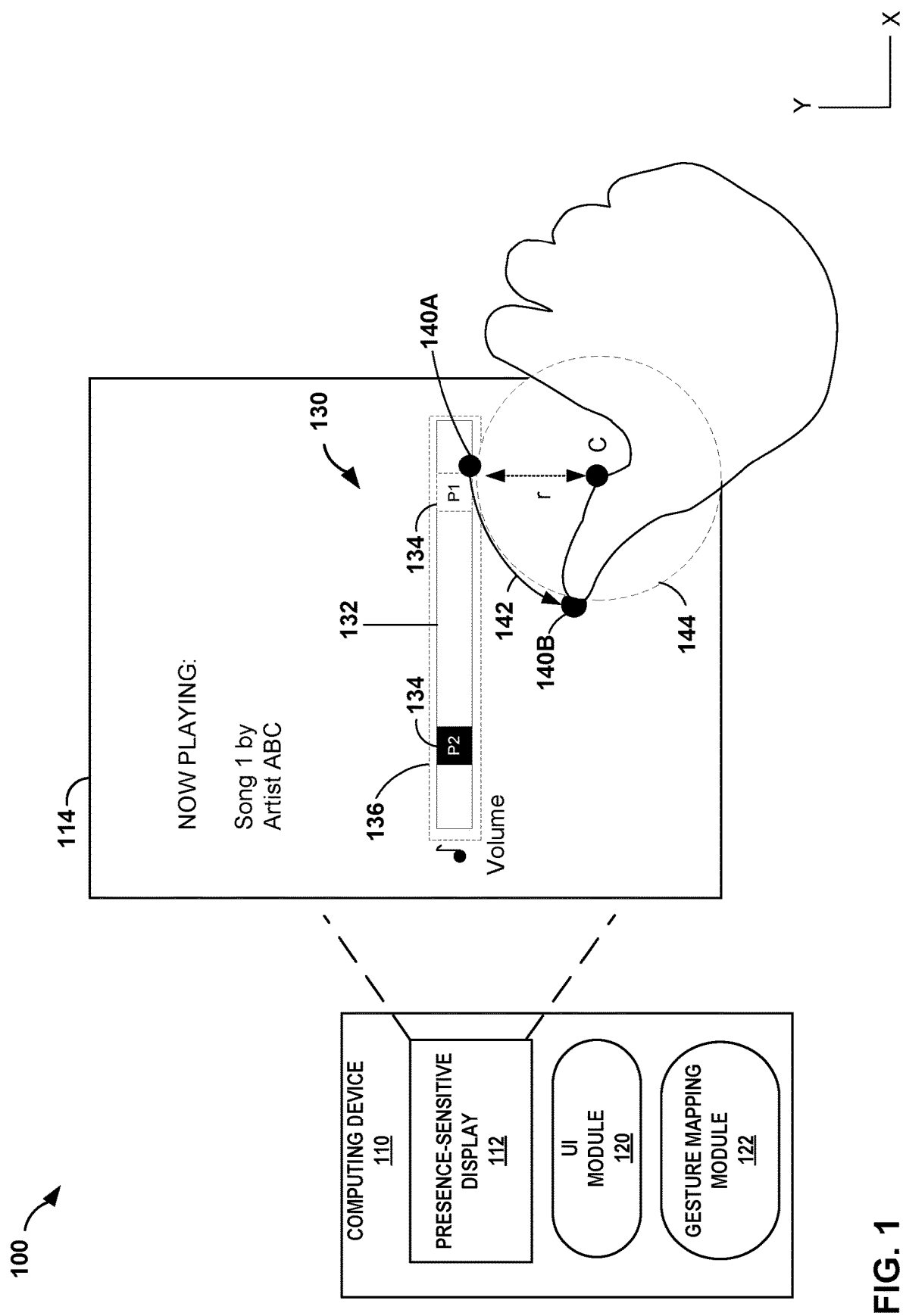
FIG. 1 is a conceptual diagram illustrating an example computing device that is configured to map gestures in two directions to a single direction, in accordance with one or more aspects of the present disclosure.

FIG. 1 is a conceptual diagram illustrating an example computing device 110 that is configured to map gestures in two directions to a single direction (e.g., for performing one-handed gestures), in accordance with one or more aspects of the present disclosure. Computing device 110 may be any type of computing device, such as a laptop, smartphone, tablet, smartwatch, or any other type of portable computing device. Additional examples of computing device 110 include other mobile and non-mobile devices, such as desktop computers, televisions, personal digital assistants (PDA), portable and non-portable gaming systems, digital media players or micro-consoles, e-book readers, mobile television platforms, automobile navigation and entertainment systems, or any other types of wearable and non-wearable, mobile or non-mobile computing devices.

As shown in FIG. 1, computing device 110 includes a presence-sensitive display (PSD) 112, user interface (UI) module 120, and gesture mapping module (GMM) 122. Modules 120 and 122 may perform operations described using software, hardware, firmware, or a mixture of hardware, software, and firmware residing in and/or executing at computing device 110. Computing device 110 may execute modules 120 and 122 with multiple processors or multiple devices. Computing device 110 may execute modules 120 and 122 as virtual machines executing on underlying hardware. Modules 120 and 122 may execute as one or more services of an operating system or computing platform. Modules 120 and 122 may execute as one or more executable programs at an application layer of a computing platform.

PSD 112 of computing device 110 may function as respective input and/or output devices for computing device 110. PSD 112 may be implemented using various technologies. For instance, PSD 112 may function as input devices using presence-sensitive input screens, such as resistive touchscreens, surface acoustic wave touchscreens, capacitive touchscreens, projective capacitive touchscreens, pressure sensitive screens, acoustic pulse recognition touchscreens, radar, or another presence-sensitive display technology. PSD 112 may detect input from a user of computing device 110. For example, PSD 112 may detect one or more gestures performed on or within a threshold distance of PSD 112 (e.g., a user touching PSD 112 with a finger or a stylus or moving the finger or stylus within a threshold distance of a surface of PSD 112).

PSD 112 may also function as output (e.g., display) devices using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing device 110. PSD 112 may output information (e.g., to a user) as a user interface (e.g., graphical user interface 114), which may be associated with functionality provided by computing device 110. For example, PSD 112 may display various user interfaces related to an application module or other features of computing platforms, operating systems, applications, and/or services executing at or accessible from computing device 110.

UI module 120 manages user interactions with PSD 112 and other components of computing device 110. For example, UI module 120 may cause PSD 112 to display graphical user interface (GUI) 114 as a user of computing device 110 views output and/or provides input at PSD 112. UI module 120 may receive information from a component of computing device 110 that forms a basis for some or all of GUI 114. In response, UI module 120 may output instructions and information to PSD 112 that cause PSD 112 to display GUI 114 according to the information received from the component of computing device 110. In the example of FIG. 1, GUI 114 includes graphical slider 130. While shown as a horizontal slider, in some examples, graphical slider 130 may be a vertical slider.

Graphical slider 130 may be associated with a hardware component or software component of computing device 110. Examples of hardware components include a speaker or a display device. For example, graphical slider 130 may represent a volume of the speaker (e.g., ringer volume, media volume, etc.) or a brightness or luminosity of light emitted by PSD 112. Examples of software components include an operating system or application, such as a word processing application, an internet browser, a media player application, or any other application. For example, graphical slider 130 may represent a scrubber bar (also referred to as a scroll bar) of a word processing application, an internet browser, or other application.

Graphical slider 130 includes, in some examples, trackbar 132 and position indicator 134. In some examples, trackbar 132 defines an axis in one direction (e.g., the X-direction). Position indicator 134 indicates a current value of a characteristic (e.g., volume, media playback time, document position, etc.) of the hardware or software component that is tracked by trackbar 132. In the example of FIG. 1, position indicator 134 indicates a value of the volume of media played by computing device 110. In one example, position indicator 134 may be located at trackbar position P1 at a first time.

In some examples, PSD 112 detects a user input 142 while displaying GUI 114. For example, PSD 112 may detect user input 142 as an input device (e.g., a user's thumb) traverses an arc from one user input location 140A to another user input location 140B. User input locations 140A and 140B may include the initial position and ending position, respectively, at which the user's thumb provides user input 142 at PSD 112. While shown as detecting user input 142 at two user input locations 140, PSD 112 may detect user input 142 at numerous user input locations. In the example of FIG. 1, user input 142 includes a displacement in the direction defined by trackbar 132 (e.g., the X-direction) and a displacement in a direction perpendicular to the direction defined by trackbar 132 (e.g., the Y-direction). PSD 112 may output data indicating user input 142 to UI module 120.

UI module 120 may receive one or more indications of user input 142 from PSD 112 as the user interacts with the user interfaces (e.g., GUI 114). UI module 120 disseminates information about user inputs detected by PSD 112 to other components of computing device 110 for interpreting the inputs and for causing computing device 110 to perform one or more functions in response to the inputs. For example, UI module 120 may generate one or more touch events based on the detected input. A touch event may include information that characterizes user input, such as a location component (e.g., (x, y) coordinates) of the user input, a time component (e.g., when the user input was received), a force component (e.g., an amount of pressure applied by the user input), or other data (e.g., speed, acceleration, direction, density, etc.) about the user input. In one example, UI module 120 generates a touch event for each user input position (e.g., (x, y) coordinates) along the path of user input 142 as user input 142 moves from user input location 140A to 140B and sends an indication of each touch event to GMM 122 for further interpretation.

In accordance with techniques of this disclosure, GMM 122 maps user input 142 in two directions to a single direction. In some examples, the user may perform a user input with the same hand that holds computing device 110. In contrast to some computing devices which utilize inputs in the first direction and ignore inputs in the second direction, in some examples, GMM 122 enables the user of computing device 110 to adjust the trackbar position of position indicator 134 based on inputs in both the first and second direction to cause position indicator 134 to move a distance that more accurately reflects the total distance of user input 142.

In the example of FIG. 1, GMM 122 receives data indicative of a plurality of touch events from UI module 120 as user input 142 traverses from user input location 140A to user input location 140B. GMM 122 may determine a circle 144 including an arc that approximates the path of user input 142. In one example, GMM 122 determines circle 144 by applying a curve fitting algorithm to the touch events or other techniques known in the art. That is, GMM 122 may apply the curve fitting algorithm to each touch event for each respective user input location 140 to determine circle 144.

GMM 122 may calculate a bending rate of the path of user input 142 (e.g., based on circle 144). In some examples, the bending rate may also be referred to as the radius of curvature. In one example, GMM 122 determines the bending rate k as equal to the reciprocal of radius r of circle 144, as shown in Equation 1.

$$r = \frac{1}{k} \qquad \text{Equation 1}$$

As discussed in further detail below, in some examples, GMM 122 may calculate the bending rate as a bending vector. For instance, GMM 122 may determine the bending vector as a vector from a crossing point (e.g., a point at which the path of user input 142 crossed boundary 136) to the location of the user's most recent movement (e.g., user input location 140B).

In some examples, GMM 122 may re-calculate the bending rate upon receiving data indicative of another user input location 140 of user input 142. For example, GMM 122 may re-calculate the bending rate in response to receiving another touch event for user input 142.

In some examples, GMM 122 calculates the bending rate in response to determining that the quantity of user input locations satisfies a threshold quantity of input locations (e.g., three, five, ten, or any other quantity of input locations). GMM 122 may refrain from calculating the bending rate while the quantity of user input locations 140 does not satisfy (e.g., is less than) a threshold quantity of user input locations and calculates the bending rate in response to determining the number of user input locations satisfies (e.g., is greater than or equal to) the threshold quantity of user input locations. In this way, GMM 122 may reduce or limit variations in the bending rate as GMM 122 recalculates the bending rate. Reducing variations in the bending rate when re-calculating the bending rate may improve the user experience by causing GMM 122 to more consistently and predictably map user input 142 and adjust the position of position indicator 134.

GMM 122 may determine the bending rate in response to determining that user input 142 lies outside a boundary 136 (also referred to as a buffer) of graphical slider 130. It should be understood that boundary 136 may not necessarily be shown in GUI 114. In one example, boundary 136 may be a pre-defined number of pixels beyond the region of PSD 112 that displays graphical slider 130. By refraining from determining the bending rate until user input 142 crosses boundary 136 of graphical slider 130, GMM 122 may improve the user experience by mapping user inputs only when the user input deviates off the path of the slider. Further, refraining from determining the bending rate until user input 142 crosses boundary 136 of graphical slider 130 may reduce the number of computations performed by computing device 110 and potentially increase the battery life of computing device 110.

GMM 122 may determine a value of the displacement in a first direction that is defined by trackbar 132 and a value of the displacement in a second direction that is perpendicular to the direction defined by trackbar 132. That is, GMM 122 may determine the total displacement in the X-direction and the total displacement in the Y-direction between user input locations 140A and 140B. In other words, GMM 122 may determine the distance between user input locations 140A and 140B in each of the X-direction and the Y-direction.

Responsive to determining the bending rate and the displacement in each of the first and second directions, GMM 122 may map the user input in both the first direction and the second direction to a point P2 based on the bending rate and the displacement in the first and second directions. For example, GMM 122 may apply a transformation equation to the bending rate, the displacement in the first direction, and the displacement in the second direction to determine a second trackbar position P2 along trackbar 132, as further described with reference to FIG. 3. In this way, GMM 122 may determine the second trackbar position P2 that is a distance from first trackbar position P1 that more accurately reflects the actual total distance traveled by the user's thumb during user input 142.

Responsive to determining the second trackbar position P2, UI module 120 may output an updated GUI for display by PSD 112. For example, the updated GUI may include an updated graphical slider 130 having position indicator 134 located at a second trackbar position P2. In other words, position indicator 134 may be located at trackbar position P2 at second time that occurs after receiving user input 142. In one instance, the updated GUI includes a graphical indication of the actual path of user input 142. In such instances, the updated GUI may indicate the relationship between the movement of position indicator 134 and user input 142, which may enable the user of computing device 110 to easily see that motion in both directions affects the position of position indicator 134.

In some examples, UI module 120 may adjust a characteristic of the hardware component or software component of computing device 110 that is associated with graphical slider 130. For example, trackbar position P2 may indicate an updated value of the characteristic (e.g., volume, media playback time, document position, etc.) of the hardware component or software component. In the example of FIG. 1, graphical slider 130 is associated with a speaker. In such examples, UI module 120 may output a command to the speaker to change (e.g., reduce) the value of the volume of sound output by the speaker. In another example, UI module 120 may output a command to change the value of the brightness or luminosity of light emitted by PSD 112. In some instances, graphical slider 130 may be associated with a software component, such as a scrubber bar of a media player application. In such instances, UI module 120 may cause a media player application to change the value of the media playback time by advancing (or reversing) the playback of a media file.

In this way, the techniques of the disclosure may enable a computing device to map user inputs in two directions to a user input in a single direction. By mapping user inputs from two directions to a single direction to control a graphical slider, the techniques of this disclosure may cause the position indicator to travel a distance that more accurately reflects the total distance traveled by the user's thumb. Improving the accuracy of the position indicator may enable computing device 110 to more accurately adjust operation of the hardware or software component associated with the graphical slider, which may improve the user experience and potentially reduce additional user inputs needed to further adjust the hardware or software components.

While described as the user performing user input 142 with the same hand used to hold computing device 110, in some examples, the user may perform the user input with one hand while holding computing device 110 in another hand. In another example, the user may perform user input 142 with a user input device (e.g., a digit, such as their thumb, or a stylus) without holding computing device 110, such as when computing device includes a kiosk or countertop computing device.

Figure 2:
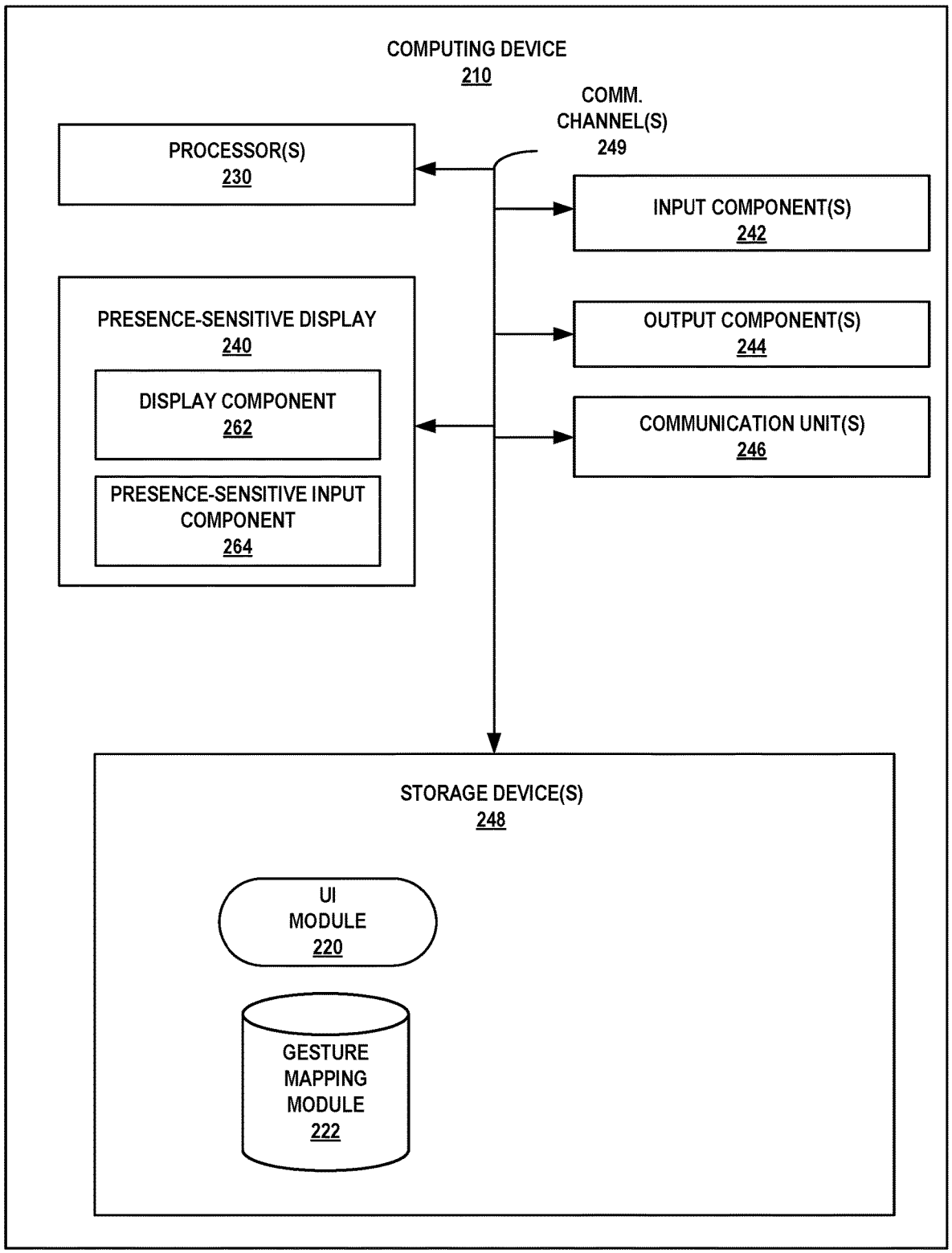
FIG. 2 is a block diagram illustrating an example computing device that is configured to map gestures in two directions to a single direction, in accordance with one or more aspects of the present disclosure.

FIG. 2 is a block diagram illustrating an example computing device that is configured to map gestures in two directions to a single direction (e.g., for performing one-handed gestures), in accordance with one or more aspects of the present disclosure. Computing device 210 is a more detailed example of computing device 110 of FIG. 1. FIG. 2 illustrates only one particular example of computing device 210, and many other examples of computing device 210 may be used in other instances and may include a subset of the components included in example computing device 210 or may include additional components not shown in FIG. 2.

As shown in the example of FIG. 2, computing device 210 includes one or more processors 230, presence-sensitive display 240, one or more input components 242, one or more output components 244, one or more communication units 246, and one or more storage devices 248. Storage devices 248 of computing device 210 include UI module 220 and GMM 222.

Communication channels 249 may interconnect each of the components 230, 240, 242, 244, 246, and/or 248 for inter-component communications (physically, communicatively, and/or operatively). In some examples, communication channels 249 may include a system bus, a network connection, one or more inter-process communication data structures, or any other components for communicating data (also referred to as information).

One or more communication units 246 of computing device 210 may communicate with external devices by transmitting and/or receiving data. For example, computing device 210 may use one or more of communication units 246 to transmit and/or receive radio signals on a radio network such as a cellular radio network. In some examples, communication units 246 may transmit and/or receive satellite signals on a satellite network such as a Global Positioning System (GPS) network. Examples of communication units 246 include a network interface card (e.g. such as an Ethernet card), an optical transceiver, a radio frequency transceiver, a GPS receiver, or any other type of device that can send and/or receive information. Other examples of communication units 246 may include short wave radios (e.g., NFC, BLUETOOTH (including BLE)), GPS, 3G, 4G, 5G, and WIFI radios found in mobile devices as well as Universal Serial Bus (USB) controllers and the like.

One or more input components 242 of computing device 210 may receive input. Examples of input are tactile, audio, kinetic, presence, and optical input, to name only a few examples. Input components 242 of computing device 210 include, in one example, a mouse, keyboard, voice responsive system, video camera, buttons, control pad, microphone or any other type of device for detecting input from a human or machine. In some examples, input component 242 may be a presence-sensitive input component, which may include a presence-sensitive screen, touch-sensitive screen, radar, etc.

One or more output components 244 of computing device 210 may generate output. Examples of output are tactile, audio, and video output. Output components 244 of computing device 210, in some examples, include a presence-sensitive screen, sound card, video graphics adapter card, speaker, cathode ray tube (CRT) monitor, liquid crystal display (LCD), or any other type of device for generating output to a human or machine. Output components 244 may include display components such as cathode ray tube (CRT) monitor, liquid crystal display (LCD), Light-Emitting Diode (LED) or any other type of device for generating tactile, audio, and/or visual output.

In some examples, presence-sensitive display 240 of computing device 210 may include functionality of input component 242 and/or output components 244. In the example of FIG. 2, presence-sensitive display 240 may include a presence-sensitive input component 264, such as a presence-sensitive screen or touch-sensitive screen. In some examples, presence-sensitive input component 264 may detect an object at and/or near the presence-sensitive input component. As one example range, presence-sensitive input component 264 may detect an object, such as a finger or stylus that is within two inches or less of presence-sensitive input component 264. Presence-sensitive input component 264 may determine a location (e.g., an (x, y) coordinate) at which the object was detected. In another example range, presence-sensitive input component 264 may detect an object two inches or less from presence-sensitive input component 264 and other ranges are also possible. Presence-sensitive input component 264 may determine the location selected by a user's finger using capacitive, inductive, radar, and/or optical recognition techniques.

In some examples, presence-sensitive display 240 may also provide output to a user using tactile, audio, or video stimuli as described with respect to output component 244. For instance, presence-sensitive display 240 may include display component 262 that displays a graphical user interface (e.g., GUI 114 of FIG. 1). Display component 262 may be any type of output component that provides visual output, such as described with respect to output components 244. While illustrated as an integrated component of computing device 210, presence-sensitive display 240 may, in some examples, be an external component that shares a data or information path with other components of computing device 210 for transmitting and/or receiving input and output. For instance, presence-sensitive display 240 may be a built-in component of computing device 210 located within and physically connected to the external packaging of computing device 210 (e.g., a screen on a mobile phone). In another example, presence-sensitive display 240 may be an external component of computing device 210 located outside and physically separated from the packaging of computing device 210 (e.g., a monitor, a projector, etc. that shares a wired and/or wireless data path with a tablet computer). In some examples, presence-sensitive display 240, when located outside of and physically separated from the packaging of computing device 210, may be implemented by two separate components: a presence-sensitive input component 264 for receiving input and a display component 262 for providing output.

One or more storage devices 248 within computing device 210 may store information for processing during operation of computing device 210 (e.g., computing device 210 may store data accessed by modules 220 and 222 during execution at computing device 210). In some examples, storage device 248 is a temporary memory, meaning that a primary purpose of storage device 248 is not long-term storage. Storage devices 248 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 248, in some examples, also include one or more computer-readable storage media. Storage devices 248 in some examples include one or more non-transitory computer-readable storage mediums. Storage devices 248 may be configured to store larger amounts of information than typically stored by volatile memory. Storage devices 248 may further be configured for long-term storage of information as non-volatile memory space and retain information after power on/off cycles. Examples of non-volatile memories include magnetic hard discs, optical discs, flash memories, or forms of electrically programmable memories (EPROM) or electrically erasable and programmable (EEPROM) memories.

Storage devices 248 may store program instructions and/or information (e.g., data) associated with modules 220 and 222. Storage devices 248 may include a memory configured to store data or other information associated with modules 220 and 222.

One or more processors 230 may implement functionality and/or execute instructions associated with computing device 210. Examples of processors 230 include application processors, display controllers, auxiliary processors, one or more sensor hubs, and any other hardware configured to function as a processor, a processing unit, or a processing device. Modules 220 and 222 may be operable by processors 230 to perform various actions, operations, or functions of computing device 210. For example, processors 230 of computing device 210 may retrieve and execute instructions stored by storage devices 248 that cause processors 230 to perform the operations described herein that are attributed to modules 220 and 222. The instructions, when executed by processors 230, may cause computing device 210 to store information within storage devices 248.

UI module 220 may include all functionality of UI module 120 of computing device 110 of FIG. 1 and may perform similar operations as UI module 120 for managing a user interface (e.g., graphical user interface 114) that computing device 210 provides at PSD 240 for handling input from, and output to, a user. For example, UI module 220 may generate instructions or commands to cause PSD 240 to display graphical user interface 114 and the elements thereof. UI module 220 may be part of or associated with an operating platform of computing device 210. For example, UI module 220 may be a sub-module, service, or activity of an operating system of computing device 210 as opposed to being a module or application of computing device 210 that is separate from the computing platform or operating system computing device 210.

GMM 222 may include all functionality of GMM 122 of computing device 110 of FIG. 1 and may perform similar operations as GMM 122. In one example, GMM 222 may map user inputs in two directions to user input in a single direction, as described above. Details of the operations of GMM 222 are described with further reference to FIG. 3.

Figure 3:
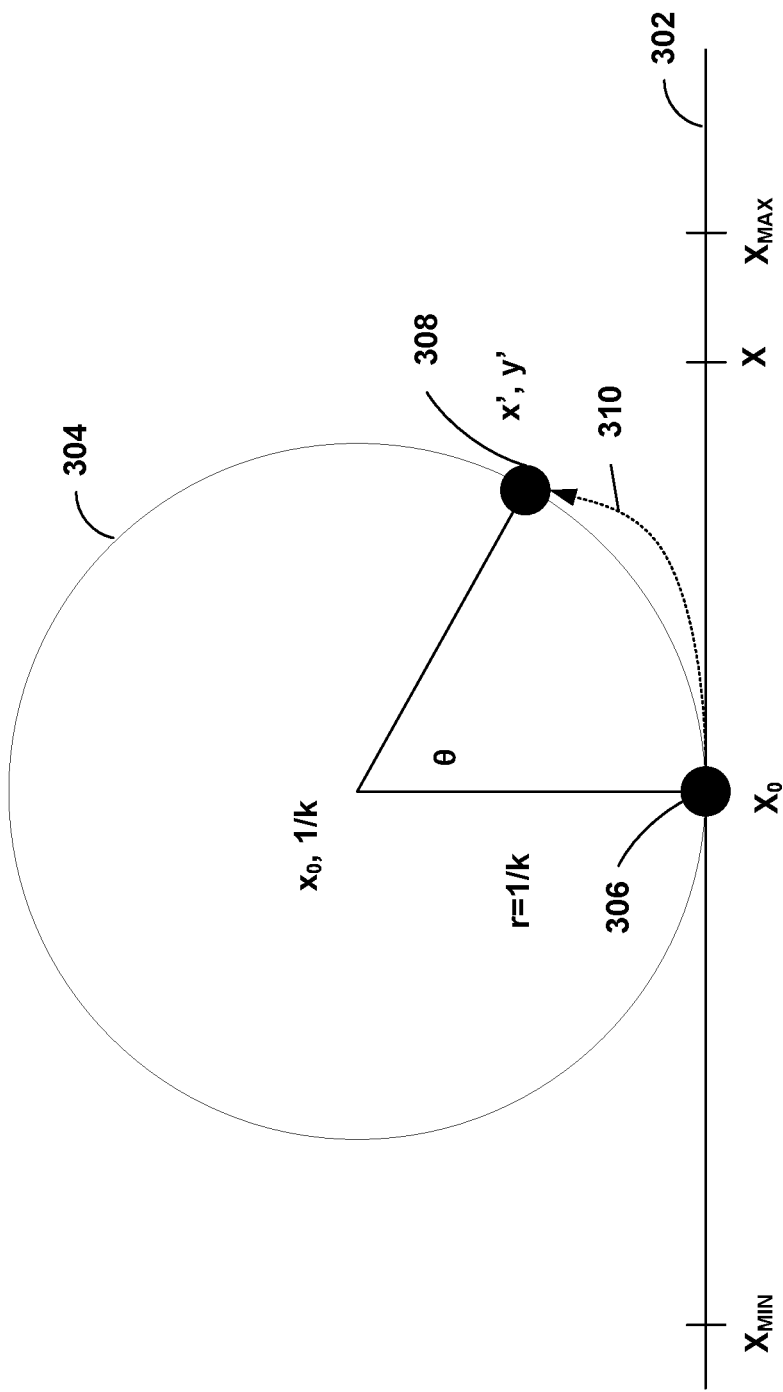
FIG. 3 is a conceptual diagram illustrating example operations performed by an example computing device that is configured to map gestures in two directions to a single direction, in accordance with one or more aspects of the present disclosure.

FIG. 3 is a conceptual diagram illustrating example operations performed by the example computing device 210 that is configured to map gestures in two directions to a single direction (e.g., for performing one-handed gestures), in accordance with one or more aspects of the present disclosure. In some examples, x-axis 302 may be the axis defined by a graphical slider, such as graphical slider 130 of FIG. 1.

In the example of FIG. 1, PSD 240 of FIG. 2 may detect a user input 310 that includes a plurality of user input locations between user input location 306 and user input location 308. GMM 222 may receive data indicative of user input 310 (e.g., via UI module 220). Responsive to receiving the data indicative of user input 310, GMM 222 may determine a location along x-axis 302 that corresponds to user input location 308 of user input 310.

In some examples, GMM 222 bends x-axis 302 along circle 304 to determine the location along x-axis 302 that corresponds to user input location 308. That is, GMM 222 may bend a graphical slider (e.g., graphical slider 130 of FIG. 1) along circle 304. For example, GMM 222 may map the coordinates of x-axis 302 to coordinates along circle 304 to transform the graphical slider from a one-direction linear slider to a two-direction curved slider.

In some examples, $x_{min}$ and $x_{max}$ represent the furthest locations along x-axis 302 that may be bent. GMM 222 may, in some instances, determine an effective bending x-coordinate ($\hat{x}$) of a location on x-axis 302 according to Equation 2.

$$\hat{x} = \begin{cases} x_{min} & \text{if } x < x_{min} \\ x_{max} & \text{if } x > x_{max} \\ x & \text{otherwise} \end{cases} \qquad \text{Equation 2}$$

In one example, GMM 222 may determine the number of radians θ associated with a given location on the x-axis 302 based on the effective bending x-coordinate $\hat{x}$, a given bending rate k, and a center of the bend $x_0$ according to Equation 3.

$$\theta = k(\hat{x} - x_0) \qquad \text{Equation 3:}$$

In some examples, GMM 222 bends the x-axis 302 along circle 304 by performing a bending transformation to map a location (x, y) along the x-axis to a location (x', y') based on Equations 4-6.

$$\kappa = \frac{1}{k} \qquad \text{Equation 4}$$

$$x' = \begin{cases} x_0 + \sin\theta(\kappa - y) & \text{if } x_{min} \le x \le x_{max} \\ x_0 + \sin\theta(\kappa - y) + \cos\theta(x - x_{min}) & \text{if } x < x_{min} \\ x_0 + \sin\theta(\kappa - y) + \cos\theta(x - x_{max}) & \text{if } x > x_{max} \end{cases} \qquad \text{Equation 5}$$

$$y' = \begin{cases} \kappa - \cos\theta(\kappa - y) & \text{if } x_{min} \le x \le x_{max} \\ \kappa - \cos\theta(\kappa - y) + \sin\theta(x - x_{min}) & \text{if } x < x_{min} \\ \kappa - \cos\theta(\kappa - y) + \sin\theta(x - x_{max}) & \text{if } x > x_{max} \end{cases} \qquad \text{Equation 6}$$

In some examples, when k is negative, the y-coordinates and k may be inverted (e.g., y'=−y', k=−k). In this way, GMM 222 may bend the graphical slider by bending the axis defined by the trackbar (e.g., trackbar 132 of FIG. 1) of the graphical slider (e.g., graphical slider 130 of FIG. 1)

In some examples, GMM 222 may determine the location along x-axis 302 that corresponds to user input location 308 by "unbending" user input 310 to a straight line defined by x-axis 302 (e.g., rather than bending x-axis 302 that defines the graphical slider). In other words, GMM 222 may map a user input 310 that traverses two directions to a single direction (e.g., to map user input location 308 to a location on x-axis 302). That is, GMM 222 may map a curved user input to a location on an axis of a linear, one-dimensional graphical slider.

GMM 222 may determine a circle 304 that includes an arc approximating the path of the user input 310 that traverses two directions (e.g., that includes horizontal and vertical movement). GMM 122 may determine circle 304 by fitting the user input locations of user input 310 (e.g., least-squares fit) to the standard equation of a circle, shown in Equation 7.

$$(x-a)^2 + (y-b)^2 = r^2 \qquad \text{Equation 7:}$$

In some examples, GMM 222 determines a bending rate k of the user input 310 as equal to the reciprocal of the radius of circle 304. In such examples, GMM 222 may determine the bending rate k by fitting the user input locations of user input 310 to Equation 8.

$$(x - x_0)^2 + \left(y - \frac{1}{k}\right)^2 = \left(\frac{1}{k}\right)^2 \qquad \text{Equation 8}$$

GMM 222 may re-calculate the bending rate each time GMM 222 receives data indicating another user input location of user input 310.

In some examples, GMM 222 may determine whether the bending rate k satisfies (e.g., is less than or equal to) a threshold bending rate. GMM 222 may determine the threshold bending rate based on the maximum thumb length of a human. In one example, GMM 222 may determine that bending rate k satisfies the threshold bending rate (e.g., when radius r of circle 304 is greater than the maximum human thumb length). In such examples, GMM 222 may set the bending rate equal to the threshold bending rate in response to determining that the bending rate k satisfies a threshold bending rate. In other words, in some examples, GMM 222 may limit or otherwise clip the bending rate to the threshold bending rate.

GMM 222 may determine a minimum bending angle and a maximum bending angle according to equations 9 and 10, respectively.

$$\theta_{min} = k(x_{min} - x_0) \qquad \text{Equation 9:}$$

$$\theta_{max} = k(x_{max} - x_0) \qquad \text{Equation 10:}$$

GMM 222 may determine the radius of circle 304, a number of radians associated with user input location 308, and the effective bending x-coordinate $\hat{x}$ according to Equations 11-13, respectively.

$$r = \sqrt{(x' - x_0)^2 + \left(y' - \frac{1}{k}\right)^2} \qquad \text{Equation 11}$$

$$\theta = \frac{(x' - x_0)}{r} \qquad \text{Equation 12}$$

$$\hat{x} = x_0 + \kappa * \theta \qquad \text{Equation 13}$$

GMM 222 may map the user input location 310 to a coordinate on x-axis 302 based on the bending rate k and the displacement of user input 310 in both the x-direction and the y-direction. For example, GMM 222 may perform an inverse transformation to map user input location 308 having coordinates (x', y') to a location (x, y) along x-axis 302 based on equations 14-15.

$$x = \begin{cases} \hat{x} & \text{if } \theta_{min} < \theta < \theta_{max} \\ \hat{x} + \cos\theta_{min}(x' - x_0) + \sin\theta_{min}(1 - \kappa) & \text{if } \theta < \theta_{min} \\ \hat{x} + \cos\theta_{max}(x' - x_0) + \sin\theta_{max}(1 - \kappa) & \text{if } \theta > \theta_{max} \end{cases} \qquad \text{Equation 14}$$

-continued $$y = \begin{cases} \kappa - r & \text{if } \theta_{min} < \theta < \theta_{max} \\ \dfrac{y - \kappa - \sin\theta_{min}(x - x_{min})}{\cos\theta_{min} + \kappa} & \text{if } \theta < \theta_{min} \\ \dfrac{y - \kappa - \sin\theta_{max}(x - x_{max})}{\cos\theta_{min} + \kappa} & \text{if } \theta > \theta_{max} \end{cases} \quad \text{Equation 15}$$

It should be understood that the bending transformation and inverse transformation equations may be adapted to any arbitrary axis, including a parametric axis (e.g., for non-planar or non-rectangular devices). For instance, the axis may be shaped to follow the curvature of the display.

Responsive to mapping user input location 308 having coordinates (x', y') to coordinates (x, y), computing device 210 may move a position indicator of the graphical slider to the trackbar position having the mapped (x, y) coordinates. For example, UI module 120 may output an updated GUI for display by PSD 240 that includes an updated graphical slider 130 having a position indicator located at a trackbar position having the mapped (x, y) coordinates.

In some examples, UI module 220 adjusts a characteristic of the hardware component or software component of computing device 210 that is associated with the graphical slider. In an example where the graphical slider is associated with the display brightness of display component 262, UI module 220 may adjust (e.g., increase or decrease) the brightness of light emitted by display component 262. In another example where the graphical slider is associated with the content of a document or file of an application executing at computing device 210, UI module 220 may output the content of the document or file that is associated with the updated trackbar position having the mapped (x, y) coordinates.

Figure 4B:
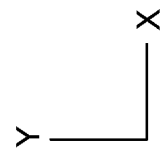
FIGS. 4A-4C are conceptual diagrams illustrating example operations performed by an example computing device that utilizes a single direction of a gesture to control a graphical slider, in accordance with one or more aspects of the present disclosure.
Figure 4B:
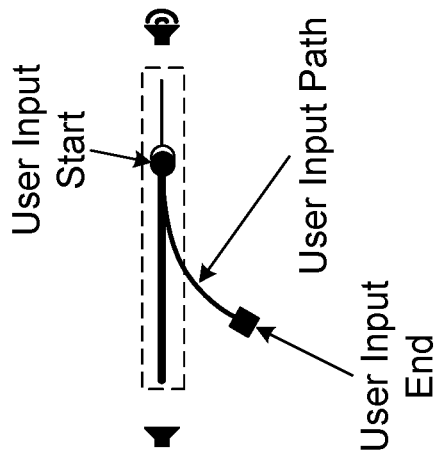
Figure 4A:
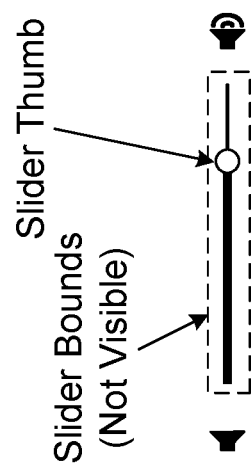
Figure 4C:
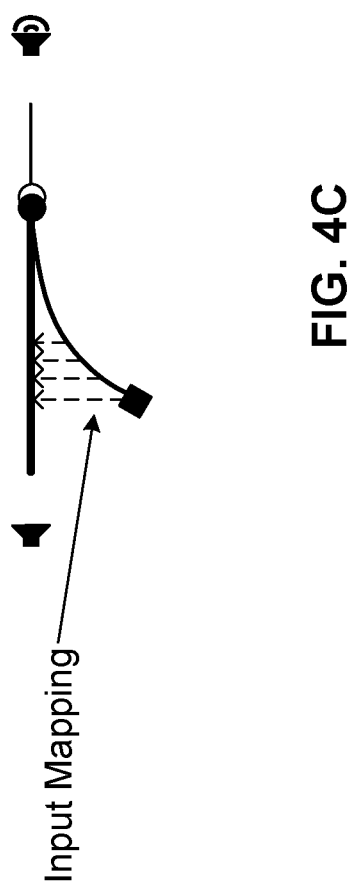

FIGS. 4A-4C are conceptual diagrams illustrating example operations performed by an example computing device that utilizes a single direction of a gesture to control a graphical slider, in accordance with one or more aspects of the present disclosure. FIG. 4A illustrates a graphical slider and a slider bounds (also referred to as a boundary of the graphical slider). As shown in FIG. 4A, the graphical slider includes a "slider thumb" (also referred to as a position indicator). In one example, the graphical slider is associated with the volume control of a speaker of the computing device. As illustrated in FIG. 4B, a user may acquire the slider thumb by touching the slider thumb and performing a user input to drag the slider thumb to change the volume (e.g., dragging left to decrease the volume). For example, the user input may travel from the user input start location along a curved user input path to the user input end location. In some examples, where only a single direction of input is used to control a graphical slider, when the user input passes outside of the graphical slider's bounds, the user input may either be dropped (e.g., the user will lose control of the slider and will have to re-acquire the slider thumb) or will be improperly mapped back to the slider bounds (as illustrated in FIG. 4C).

As shown in FIG. 4C, according to some techniques, a computing device maps the user input in the x-direction to the axis of the graphical slider, while discarding the user input in the y-direction. For example, the computing device may behave as if the user input is still within the slider bounds but may discard the vertical movement of the user input and map only the horizontal movement back onto the graphical slider. In this way, the user may lose direct manipulation control of a graphical slider widget. For example, while the distance of the user's input and the distance of a graphical slider's output is typically 1:1 (e.g., the user drags the graphical slider 1 cm and the graphical slider moves 1 cm on the display), by discarding the vertical movement, the amount of movement of the graphical slider (e.g., the distance the slider moves) is not directly connected to the user input. That is, the distance by which the slider moves does not correspond (e.g., equal) the distance of the user input.

Similarly, discarding movement in one direction does not respect the curved nature of the user's input posture. For example, if the user wants to drag the graphical slider all the way to the left, the user input must similarly move all the way to the left. That is, when the user reaches the limit of their reach (e.g., the reach of the user's thumb), the user will be unable to move the graphical slider further even if the user can continue to move their thumb vertically. In this way, the user must disengage from the device, adjust his/her hand posture, and re-acquire the slider thumb to complete the task.

FIGS. 5A-5D are conceptual diagrams illustrating example operations performed by an example computing device that is configured to map gestures in two directions to a single direction, in accordance with one or more aspects of the present disclosure.

Figure 5A:
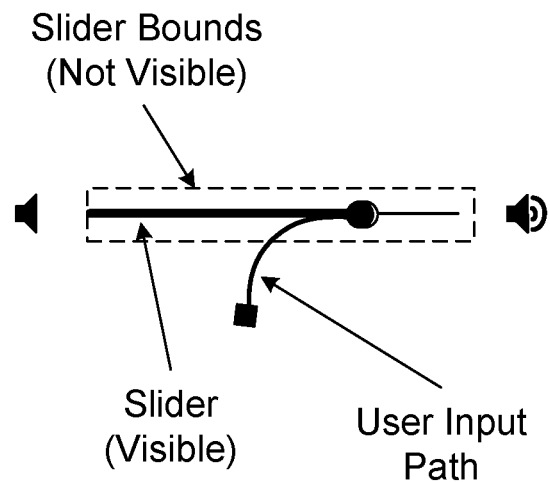
FIGS. 5A-5D are conceptual diagrams illustrating example operations performed by an example computing device that is configured to map gestures in two directions to a single direction, in accordance with one or more aspects of the present disclosure.
Figure 5B:
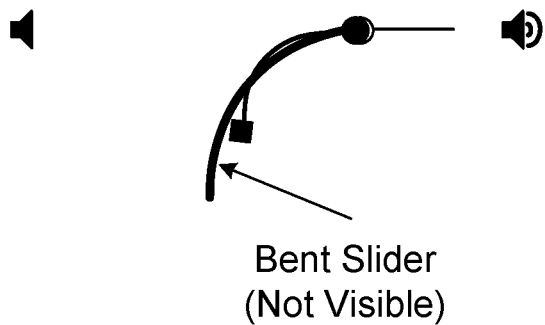

FIG. 5A illustrates a graphical slider and a slider bounds (also referred to as a boundary of the graphical slider). As shown in FIG. 5A, the computing device may receive a user input that has a curved or arced user input path. That is, the user input may move in two directions (e.g., horizontally and vertically). As illustrated in FIG. 5B, the computing device may map the user input in both directions to a single direction. That is, the computing device determines the curvature of the user input and interprets the user input as if the graphical slider were similarly curved.

Figure 5C:
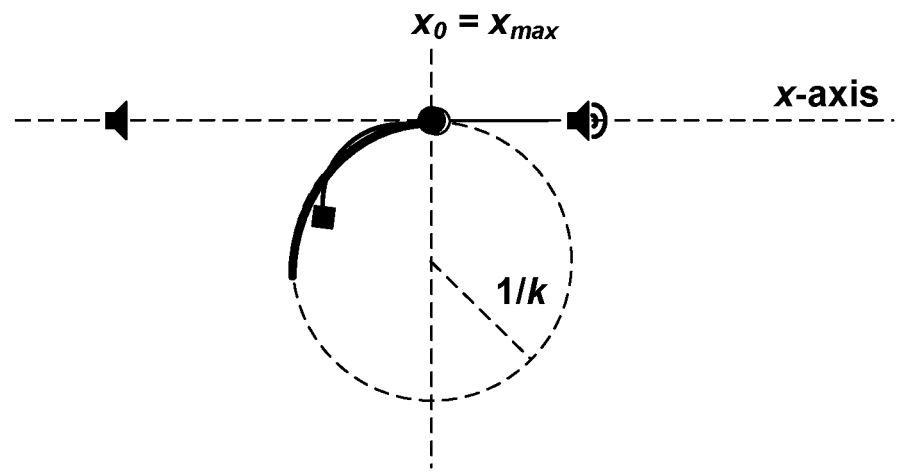
Figure 5D:
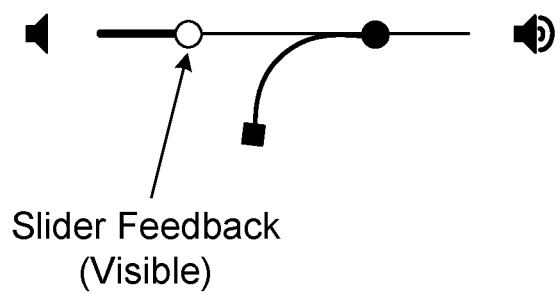

As shown in FIG. 5C, the computing device determines a circle that includes an arc that approximates the user input path and a bending rate of the user input, as described above. The computing device may map the user input in the x-direction and the y-direction to a single direction (e.g., based on the equations above). In the examples of FIGS. 5A-5D, $x_0$ is the first received input location along the x-axis. $x_{min}$ may be negative infinity ($-\infty$) if the user input moves left (e.g., from $x_0$) and $x_0$ otherwise (e.g., if the user input moves right from $x_0$). $x_{max}$ may be positive infinity ($+\infty$) if the user input moves right (e.g., from $x_0$) and $x_0$ otherwise (e.g., if the user input moves left from $x_0$). As shown in FIG. 5D, the user input is interpreted and feedback is given to the user as if the user input were not curved. For instance, as illustrated in FIG. 5D, while the user input travels one distance in the x-direction, the computing device maps the user input in both the x-direction and the y-direction to the x-direction causing the slider thumb to travel further than the displacement of the user input in the x-direction. That is, the computing device may calculate the position of the slider thumb or position indicator based on movement in both directions and output an updated GUI where the displacement of the slider thumb is based on the displacement of the user input in both the x-direction and y-direction.

Figure 6:
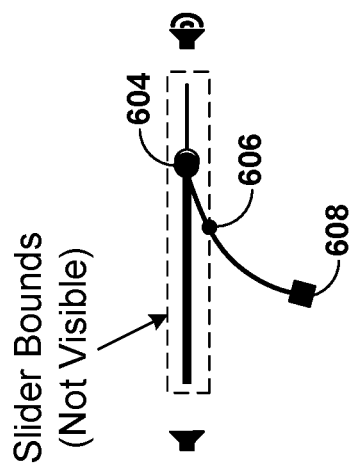
FIG. 6 is a conceptual diagram illustrating example operations performed by an example computing device that is configured to map gestures in two directions to a single direction, in accordance with one or more aspects of the present disclosure.

FIG. 6 is a conceptual diagram illustrating example operations performed by an example computing device that is configured to map gestures in two directions to a single direction, in accordance with one or more aspects of the present disclosure. As discussed above, in some examples, a gesture mapping module may determine a circle that includes an arc approximating the path of user input that traverses two directions (e.g., that includes horizontal and vertical movement). For instance, GMM 222 may determine a circle 304 that includes an arc approximating the path of the user input 310 that traverses two directions.

In addition to, or as an alternative, to the aforementioned circle determination techniques, a gesture mapping module may determine a circle that includes an arc approximating the path of user input that traverses two directions based on three points from the path of user input. For instance, GMM 222 may determine a circle based on a first point in the path of user input (e.g., point 604) represented as $(x_1, y_1)$, a point in the path of user input where the path crossed the slider's bounds (e.g., point 606) represented as $(x_2, y_2)$, and a most recent point in the path of user input (e.g., point 608) represented as $(x_3, y_3)$. From at least these three points, the gesture mapping module (e.g., GMM 222) may determine a circle described by Equation 16:

$$Ax^2+Ay^2+Bx+Cy+D=0 \quad \text{Equation 16:}$$

Where A, B, C, and D are determined based on the aforementioned three points (e.g., 604, 606, 608) in accordance with Equations 17-20:

$$A = \begin{vmatrix} x_1 & y_1 & 1 \\ x_2 & y_2 & 1 \\ x_3 & y_3 & 1 \end{vmatrix} \quad \text{Equation 17}$$

$$B = \begin{vmatrix} x_1^2+y_1^2 & y_1 & 1 \\ x_2^2+y_2^2 & y_2 & 1 \\ x_3^2+y_3^2 & y_3 & 1 \end{vmatrix} \quad \text{Equation 18}$$

$$C = \begin{vmatrix} x_1^2+y_1^2 & x_1 & 1 \\ x_2^2+y_2^2 & x_2 & 1 \\ x_3^2+y_3^2 & x_3 & 1 \end{vmatrix} \quad \text{Equation 19}$$

$$D = \begin{vmatrix} x_1^2+y_1^2 & x_1 & y_1 \\ x_2^2+y_2^2 & x_2 & y_2 \\ x_3^2+y_3^2 & x_3 & y_3 \end{vmatrix} \quad \text{Equation 20}$$

As such, the circle determined by gesture mapping module may be centered at a point given by Equation 21:

$$(x, y) = \left(-\frac{B}{2A}, -\frac{C}{2A}\right) \quad \text{Equation 21}$$

And may have a radius r given by Equation 22:

$$r=\sqrt{(x-x_1)^2+(y-y_1)^2} \quad \text{Equation 22:}$$

The gesture mapping module may utilize the circle determined in this way in addition to, or as an alternative, to circle 304 as described above with reference to FIG. 3. For instance, GMM 222 may utilize the circle determined based on the three points to determine a bending rate for mapping user input in two directions into a single direction (e.g., determine the bending rate k of the user input 310 as equal to the reciprocal of the radius of the circle determined based on the three points).

Figure 7:
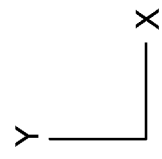
FIG. 7 is a conceptual diagram illustrating example operations performed by an example computing device that is configured to map gestures in two directions to a single direction, in accordance with one or more aspects of the present disclosure.
Figure 7:
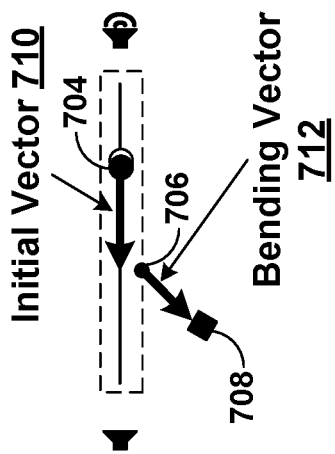

FIG. 7 is a conceptual diagram illustrating example operations performed by an example computing device that is configured to map gestures in two directions to a single direction, in accordance with one or more aspects of the present disclosure. As discussed above, a gesture mapping module, such as GMM 122, may determine a bending vector as a vector from a point at which the path of user input crossed a boundary of a slider to a point of the user's most recent movement. For instance, as shown in FIG. 7, a gesture mapping module may determine bending vector 712 as a vector connecting point 706 (i.e., a point at which the path of user input crossed a boundary) and point 708 (i.e., a point of the user's most recent movement).

As discussed above, a gesture mapping module may map gestures in two directions to a single direction. In accordance with one or more techniques of this disclosure, a gesture mapping module may map gestures in two directions to a single direction by combining a bending vector and an initial vector. The gesture mapping module may determine the bending vector as shown in FIG. 7 (e.g., bending vector 712). The gesture mapping module may determine the initial vector (e.g., initial vector 710) as a displacement in a direction parallel to the slider between a first point in the path of user input (e.g., point 704) and a point in the path of user input where the path crossed the slider's bounds (e.g., point 706).

In some examples, to combine the bending vector and the initial vector, the gesture mapping module may add a length of the initial vector to a length of the bending vector to obtain a combined length. The gesture mapping module may map the total user input into the single direction (i.e., the direction parallel to the slider) as the combined length. For instance, where the slider is horizontal, the combined length is −19 (negative being to the left), and the position indicator (e.g., position indicator 134 of FIG. 1) started at $(x_0, y_0)$; the gesture mapping module may move the position indicator to $(x_0-19, y_0)$. In other words, the gesture mapping module may shift the first position by the combined length to obtain the second position.

As discussed above, a computing device that includes the gesture mapping module may adjust a characteristic of a hardware component or a software component that is associated with the graphical slider. In an example where the graphical slider is associated with the display brightness of a display component, the computing device may adjust (e.g., increase or decrease) the brightness of light emitted by the display component. In another example where the graphical slider is associated with the content of a document or file of an application executing at the computing device, the computing device may output the content of the document or file that is associated with the updated trackbar position having the mapped coordinates.

Figure 8:
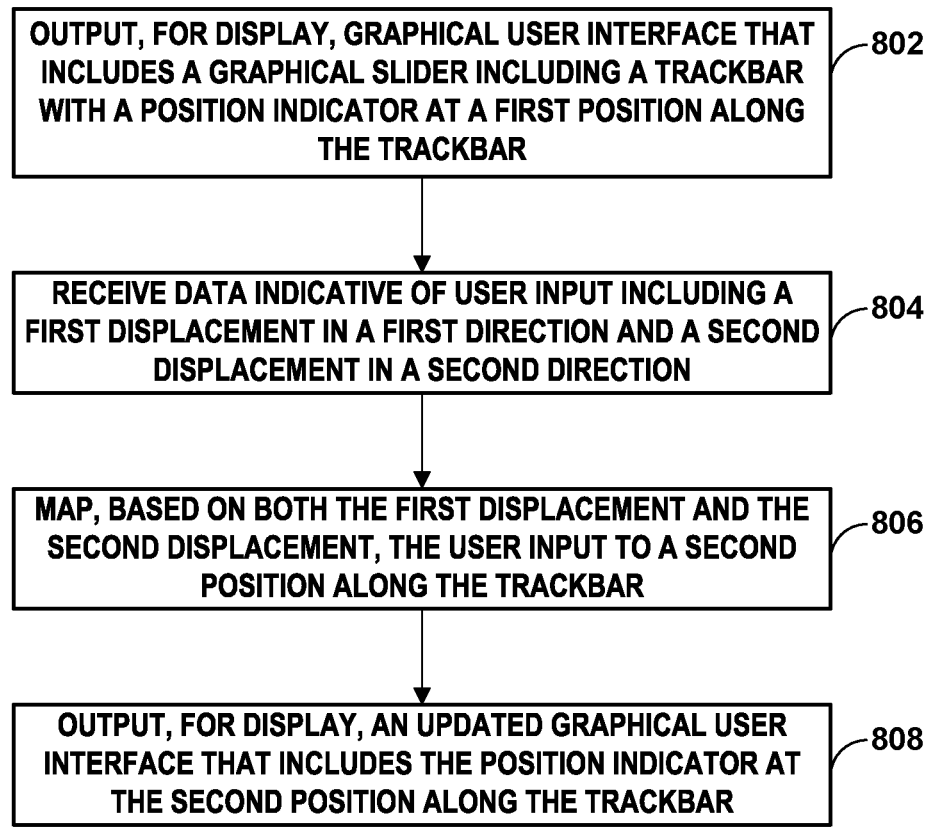
FIG. 8 is a flowchart illustrating an example technique for mapping gestures in two directions to a single direction, in accordance with one or more aspects of the present disclosure.

FIG. 8 is a flowchart illustrating an example technique for mapping gestures in two directions to a single direction, in accordance with one or more aspects of the present disclosure. For purposes of explanation, the techniques of FIG. 8 are described as being performed by computing device 110 of FIG. 1, however other computing devices may perform the techniques of FIG. 8.

Computing device 110 may output a graphical user interface that includes a graphical slider, the graphical slider including a trackbar that defines an axis in a first direction and a position indicator located at a first position along the trackbar (802). For instance, UI module 120 of computing device 110 may cause presence-sensitive display 112 to output graphical user interface 114 that includes graphical slider 130 with position indicator 134 located at first position P1.

Computing device 110 may receive data indicative of a user input including a first displacement in the first direction and a second displacement in a second direction (804). As discussed above, the first direction may be perpendicular to the second direction. For instance, UI module 120 may receive, from presence-sensitive display 112, data indicative of a user placing their finger on position indicator 134 and dragging to the side and down.

Computing device 110 may map, based on both the first displacement in the first direction and the second displacement in the second direction, the user input to a second position along the trackbar (806). For instance, gesture mapping module 122 may receive the data from UI module 120 and map the user input to second position P2. As discussed above, in some examples, to map the user input gesture mapping module 122 may determine a bending rate/bending vector. As gesture mapping module 122 performs the mapping based on both the first displacement in the first direction and the second displacement in the second direction, a distance between first position P1 and second position P2 may be different than a displacement along graphical slider 130.

Computing device 110 may output an updated graphical user interface that includes the position indicator at the second position along the trackbar (808). For instance, UI module 120 may cause presence-sensitive display 112 to output a graphical user interface that includes graphical slider 130 with position indicator 134 located at second position P2.

While illustrated as leftward movement of a graphical slider in the x-direction, it should be understood that the techniques of this disclosure may be applied to user inputs and sliders in other directions (e.g., rightward movement or vertical sliders in the y-direction). It should also be understood that techniques of this disclosure may apply to user input beyond controlling graphical sliders, such as text selection, scrolling, gestural navigation, among others.

The following numbered examples may illustrate one or more aspects of the disclosure:

Example 1. A method comprising: outputting, by a computing device and for display, a graphical user interface that includes a graphical slider, the graphical slider including a trackbar that defines an axis in a first direction and a position indicator located at a first position along the trackbar; receiving, by the computing device, data indicative of a user input including a first displacement in the first direction and a second displacement in a second direction, the first direction perpendicular to the second direction; mapping, by the computing device, based on both the first displacement in the first direction and the second displacement in the second direction, the user input to a second position along the trackbar; and outputting, by the computing device and for display, an updated graphical user interface that includes the position indicator at the second position along the trackbar.

Example 2. The method of example 1, further comprising: determining, by the computing device, based on a plurality of user input locations of the user input, a bending rate of the user input; and wherein mapping the user input to the second position along the trackbar is further based on the bending rate of the user input.

Example 3. The method of example 2, wherein determining the bending rate comprises determining the bending rate responsive to determining that a quantity of the plurality of input locations satisfies a threshold quantity.

Example 4. The method of example 2, wherein determining the bending rate comprises determining the bending rate responsive to determining that a location of the user input lies outside a boundary of the graphical slider.

Example 5. The method of example 2, wherein determining the bending rate includes: determining, by the computing device, whether the bending rate satisfies a threshold bending rate; and responsive to determining that the bending rate satisfies the threshold bending rate, clipping the bending rate to the threshold bending rate.

Example 6. The method of example 1, wherein the updated graphical user interface includes a graphical indication of an actual path of the user input.

Example 7. The method of example 1, wherein the graphical slider is associated with a hardware component of the computing device, the method further comprising adjusting, by the computing device, a characteristic of the hardware component.

Example 8. The method of example 1, wherein the graphical slider is associated with a software component of the computing device, the method further comprising adjusting, by the computing device, a characteristic of the software component.

Example 9. A computing device comprising: least one processor; and memory comprising instructions that, when executed by the at least one processor, cause the at least one processor to output, for display, a graphical user interface that includes a graphical slider, the graphical slider including a trackbar that defines an axis in a first direction and a position indicator located at a first position along the trackbar; receive data indicative of a user input including a first displacement in the first direction and a second displacement in a second direction, the first direction perpendicular to the second direction; map, based on both the first displacement in the first direction and the second displacement in the second direction, the user input to a second position along the trackbar; and output, for display, an updated graphical user interface that includes the position indicator at the second position along the trackbar.

Example 10. The computing device of example 9, further comprising instructions that cause the at least one processor to determine, based on a plurality of user input locations of the user input, a bending rate of the user input; and wherein mapping the user input to the second position along the trackbar is further based on the bending rate of the user input.

Example 11. The computing device of example 10, wherein the instructions that cause the at least one processor to determine the bending rate comprise instructions that cause the at least one processor to determine the bending rate responsive to determining that a quantity of the plurality of input locations satisfies a threshold quantity.

Example 12. The computing device of example 10, wherein the instructions that cause the at least one processor to determine the bending rate comprise instructions that cause the at least one processor to determine the bending rate responsive to determining that a location of the user input lies outside a boundary of the graphical slider.

Example 13. The computing device of example 10, wherein the instructions that cause the at least one processor to determine the bending rate comprise instructions that cause the at least one processor to: determine whether the bending rate satisfies a threshold bending rate; and clip, responsive to determining that the bending rate satisfies the threshold bending rate, the bending rate to the threshold bending rate.

Example 14. The computing device of example 9, wherein the updated graphical user interface includes a graphical indication of an actual path of the user input.

Example 15. The computing device of example 9, wherein the graphical slider is associated with a hardware component of the computing device, further comprising instructions that cause the at least one processor to adjust a characteristic of the hardware component.

Example 16. The computing device of example 9, wherein the graphical slider is associated with a software component of the computing device, further comprising instructions that cause the at least one processor to adjust a characteristic of the software component.

In one or more examples, the functions described may be implemented in hardware, software, hardware and software, firmware, hardware and firmware, or any combination thereof. If implemented in software, the functions may be stored on or transmitted over, as one or more instructions or code, a computer-readable medium and executed by a hardware-based processing unit. Computer-readable medium may include computer-readable storage media, which corresponds to a tangible medium such as data storage media, or communication media including any medium that facilitates transfer of a computer program from one place to another, e.g., according to a communication protocol. In this manner, computer-readable medium generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A method comprising:
outputting, by a computing device and for display, a graphical user interface that includes a graphical slider, the graphical slider including a trackbar that defines an axis in a first direction and a position indicator located at a first position along the trackbar;
receiving, by the computing device, data indicative of a user input at the trackbar, the user input having a curved path including a first displacement in the first direction and a second displacement in a second direction, the first direction perpendicular to the second direction;
mapping, by the computing device, based on the curved path of the user input including both the first displacement in the first direction and the second displacement in the second direction, the user input to a second position along the trackbar; and
outputting, by the computing device and for display, an updated graphical user interface that includes the position indicator at the second position along the trackbar.

2. The method of claim 1, further comprising:
determining, by the computing device, based on a plurality of user input locations of the user input, a bending rate of the user input,
wherein mapping the user input to the second position along the trackbar is further based on the bending rate of the user input.

3. The method of claim 2, wherein determining the bending rate comprises determining the bending rate responsive to determining that a quantity of the plurality of input locations satisfies a threshold quantity.

4. The method of claim 2, wherein determining the bending rate comprises determining the bending rate responsive to determining that a location of the user input lies outside a boundary of the graphical slider.

5. The method of claim 2, wherein determining the bending rate includes:
determining, by the computing device, whether the bending rate satisfies a threshold bending rate; and
responsive to determining that the bending rate satisfies the threshold bending rate, clipping the bending rate to the threshold bending rate.

6. The method of claim 1, wherein mapping the user input to the second position along the trackbar comprises:
determining, by the computing device, a length of an initial vector that extends only in the first direction;
determining, by the computing device, a length of a bending vector;
adding the length of the initial vector to the length of the bending vector to obtain a combined length; and
determining the second position by shifting the first position by the combined length.

7. The method of claim 1, wherein the updated graphical user interface includes a graphical indication of an actual path of the user input.

8. The method of claim 1, wherein the graphical slider is associated with a hardware component of the computing device, the method further comprising adjusting, by the computing device, a characteristic of the hardware component.

9. The method of claim 1, wherein the graphical slider is associated with a software component of the computing device, the method further comprising adjusting, by the computing device, a characteristic of the software component.

10. The method of claim 1, wherein the curved path of the user input has a starting point and an ending point, wherein the starting point is at the trackbar, and wherein the starting point is more proximal to the axis defined by the trackbar than the ending point.

11. A computing device comprising:
   at least one processor; and
   memory comprising instructions that, when executed by the at least one processor, cause the at least one processor to:
      output, for display, a graphical user interface that includes a graphical slider, the graphical slider including a trackbar that defines an axis in a first direction and a position indicator located at a first position along the trackbar;
      receive data indicative of a user input at the trackbar, the user input having a curved path including a first displacement in the first direction and a second displacement in a second direction, the first direction perpendicular to the second direction;
      map, based on the curved path of the user input including both the first displacement in the first direction and the second displacement in the second direction, the user input to a second position along the trackbar; and
      output, for display, an updated graphical user interface that includes the position indicator at the second position along the trackbar.

12. The computing device of claim 11, further comprising instructions that cause the at least one processor to:
   determine, based on a plurality of user input locations of the user input, a bending rate of the user input,
   wherein the instructions that cause the at least one processor to map the user input to the second position along the trackbar comprise instructions that cause the at least one processor to map the user input to the second position along the trackbar based on the bending rate of the user input.

13. The computing device of claim 12, wherein the instructions that cause the at least one processor to determine the bending rate comprise instructions that cause the at least one processor to determine the bending rate responsive to determining that a quantity of the plurality of input locations satisfies a threshold quantity.

14. The computing device of claim 12, wherein the instructions that cause the at least one processor to determine the bending rate comprise instructions that cause the at least one processor to determine the bending rate responsive to determining that a location of the user input lies outside a boundary of the graphical slider.

15. The computing device of claim 12, wherein the instructions that cause the at least one processor to determining the bending rate comprise instructions that cause the at least one processor to:
   determine whether the bending rate satisfies a threshold bending rate; and
   clip, responsive to determining that the bending rate satisfies the threshold bending rate, the bending rate to the threshold bending rate.

16. The computing device of claim 11, wherein the instructions that cause the at least one processor to map the user input to the second position along the trackbar comprise instructions that cause the at least one processor to:
   determine a length of an initial vector that extends only in the first direction;
   determine a length of a bending vector;
   add the length of the initial vector to the length of the bending vector to obtain a combined length; and
   determine the second position by shifting the first position by the combined length.

17. The computing device of claim 11, wherein the updated graphical user interface includes a graphical indication of an actual path of the user input.

18. The computing device of claim 11, wherein the graphical slider is associated with a hardware component of the computing device, and wherein the instructions further cause the at least one processor to adjust a characteristic of the hardware component.

19. The computing device of claim 11, wherein the graphical slider is associated with a software component of the computing device, and wherein the instructions further cause the at least one processor to adjust a characteristic of the software component.

20. A non-transitory computer-readable storage medium comprising instructions that, when executed by at least one processor of a computing device, cause the at least one processor to: output, for display, a graphical user interface that includes a graphical slider, the graphical slider including a trackbar that defines an axis in a first direction and a position indicator located at a first position along the trackbar; receive data indicative of a user input at the trackbar, the user input having a curved path including a first displacement in the first direction and a second displacement in a second direction, the first direction perpendicular to the second direction, wherein the user input comprises a single input device traversing an arc from one user input location to another user input location; map, based on the curved path of the user input including both the first displacement in the first direction and the second displacement in the second direction, the user input to a second position along the trackbar; and output, for display, an updated graphical user interface that includes the position indicator at the second position along the trackbar.

* * * * *